(12) United States Patent
Schencke et al.

(10) Patent No.: US 10,498,182 B2
(45) Date of Patent: Dec. 3, 2019

(54) ELECTRIC MACHINE HAVING MECHANICAL FIELD WEAKENING AND INCLUDING A FAIL-SAFE ACTUATOR SYSTEM

(71) Applicant: Schaeffler Technologies AG & Co. KG, Herzogenaurach (DE)

(72) Inventors: Thomas Schencke, Langewiesen (DE); Thomas Pfund, Leiberstung (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 468 days.

(21) Appl. No.: 15/323,145

(22) PCT Filed: Apr. 16, 2015

(86) PCT No.: PCT/DE2015/200264
§ 371 (c)(1),
(2) Date: Dec. 30, 2016

(87) PCT Pub. No.: WO2016/000699
PCT Pub. Date: Jan. 7, 2016

(65) Prior Publication Data
US 2017/0163108 A1 Jun. 8, 2017

(30) Foreign Application Priority Data
Jul. 3, 2014 (DE) .......................... 10 2014 212 872

(51) Int. Cl.
*H02K 1/28* (2006.01)
*H02K 21/02* (2006.01)
(Continued)

(52) U.S. Cl.
CPC ............. *H02K 1/28* (2013.01); *H02K 1/2773* (2013.01); *H02K 11/20* (2016.01); *H02K 21/028* (2013.01); *H02K 1/278* (2013.01)

(58) Field of Classification Search
CPC ..... H02K 1/2773; H02K 1/278; H02K 21/028
(Continued)

(56) References Cited

U.S. PATENT DOCUMENTS

2006/0091752 A1* 5/2006 Adaniya ............. F04B 27/0895
310/156.16
2006/0284580 A1* 12/2006 Kitamura ............. H02K 11/048
318/268
(Continued)

FOREIGN PATENT DOCUMENTS

CN 1252642 A 5/2000
CN 101783536 A 7/2010
(Continued)

*Primary Examiner* — Gary A Nash
(74) *Attorney, Agent, or Firm* — Davidson, Davidson & Kappel, LLC

(57) ABSTRACT

A dynamoelectric permanently excited machine having the possibility of mechanical field weakening. The machine includes a stator (1), a rotor (2) spaced apart from the stator (1) by an air gap (8), permanent magnets (4) arranged on the rotor (2) for generating an excitation field in the air gap (8), and a centrifugal-force-controlled field-weakening mechanism for weakening the excitation field in the air gap (8) in accordance with rotational speed. In order to increase the operational safety of systems that are driven by such a machine, the machine also includes a signal input for a fault signal and an actuator for controlling the field-weakening mechanism independently of rotational speed.

10 Claims, 6 Drawing Sheets

(51) Int. Cl.
 *H02K 1/27* (2006.01)
 *H02K 11/20* (2016.01)
(58) Field of Classification Search
 USPC .......................... 310/156.01, 156.07, 156.17
 See application file for complete search history.

(56) References Cited

U.S. PATENT DOCUMENTS

| | | | |
|---|---|---|---|
| 2007/0241628 A1 | 10/2007 | Himmelmann et al. | |
| 2010/0026125 A1* | 2/2010 | Hirabayashi | H02K 1/185 |
| | | | 310/156.16 |
| 2010/0259208 A1* | 10/2010 | Hao | H02K 21/028 |
| | | | 318/538 |
| 2012/0112591 A1* | 5/2012 | Feuerrohr | H02K 1/2773 |
| | | | 310/156.15 |
| 2013/0038161 A1* | 2/2013 | Pan | H02K 1/2773 |
| | | | 310/156.01 |
| 2013/0119811 A1* | 5/2013 | Kobayashi | H02K 1/02 |
| | | | 310/156.53 |
| 2013/0154436 A1* | 6/2013 | Nakano | H02K 1/148 |
| | | | 310/216.094 |

FOREIGN PATENT DOCUMENTS

| | | |
|---|---|---|
| CN | 101874338 A | 10/2010 |
| DE | 102012201347 | 8/2013 |
| EP | 2200161 | 6/2010 |
| JP | H0993846 | 4/1997 |
| JP | H0993846 A | 4/1997 |
| JP | 2001025190 | 1/2001 |

* cited by examiner

ELECTRIC MACHINE HAVING MECHANICAL FIELD WEAKENING AND INCLUDING A FAIL-SAFE ACTUATOR SYSTEM

The present invention relates to a permanently excited dynamoelectric machine which may be operated in the field weakening range.

BACKGROUND

The so-called permanently excited synchronous machine is an example of such an electric machine. Permanently excited synchronous machines are used in numerous applications in which electric drive tasks are to be carried out. In industrial applications, for example for machine tools or production machines, they are used as highly dynamic servomotors. Due to their high power density compared to other types of machines, they are also preferably used in the area of electromobility, in which the available installation space often represents a limiting variable. However, the permanently excited synchronous machine is also frequently used as a generator, for example in the field of regenerative energies, in particular wind power.

In comparison to electrically excited synchronous machines, the permanently excited synchronous machine is characterized by an increased efficiency. Ohmic losses are saved due to the fact that the permanently excited synchronous machine may dispense with electrical excitation. The excitation field of the machine is generally generated by permanent magnets situated in the rotor of the machine. A slip ring contact, which is necessary in electrically excited synchronous machines in order to supply current to an excitation coil situated on the rotor, may be dispensed with in the permanently excited synchronous machine. As a result, the maintenance effort for the permanently excited machine is also reduced compared to the electrically excited machine.

However, one disadvantage of permanent-magnet excitation is that the excitation field is not easily modifiable. In principle, a synchronous machine may be operated beyond its nominal speed by controlling the so-called field weakening range. In this range, the machine is operated at the maximum nominal power, the torque delivered by the machine being reduced with increasing rotational speed. Electrically excited synchronous machines may be operated very easily in the field weakening range by reducing the exciting current.

Options are known, also for permanently excited machines, for generating, via suitable energization of the stator of the machine, an air gap field component which counteracts the excitation field generated by the permanent magnets and thus weakens the excitation field. However, such control of the machine results in increased losses, so that the machine may be operated only at a reduced efficiency in this range.

To be able to operate permanently excited dynamoelectric machines in the field weakening range without appreciably impairing the efficiency of the machine, methods for mechanical field weakening are known from the prior art. Thus, CN 101783536 A describes a permanently excited synchronous motor with buried permanent magnets that are magnetized in the tangential direction, and which are adjoined in each case by a short circuit block that is radially displaceable, viewed radially outwardly. This short circuit block is pretensioned via a spring in such a way that the former is situated in a magnetically insulating area of the rotor at a low rotor rotational speed. With increasing rotational speed, the short circuit block is pressed outwardly against the spring tension, where it forms a short circuit path for the magnetic flux. The magnetic leakage flux guided over this short circuit path reduces the effective air gap flux of the machine, so that the field weakening operation is controlled.

SUMMARY OF THE INVENTION

It is an object of the present invention to increase the reliability in drive systems via dynamoelectric machines which are equipped with the option for mechanical field weakening.

The present invention provides a dynamoelectric machine.

A machine according to the present invention includes a stator, a rotor spaced apart from the stator via an air gap, permanent magnets situated on the rotor for generating an excitation field in the air gap, and a centrifugal force-controlled field weakening mechanism for weakening the excitation field in the air gap as a function of rotational speed.

The finding underlying the present invention is that the operational reliability for such a machine and for systems driven with the aid of such machines may be significantly increased when the machines include a signal input for an error signal, and an actuator for controlling the field weakening mechanism independently of rotational speed. By use of this actuator, in the event of an error it is possible to bring about a magnetic short circuit of the excitation field generated by the permanent magnets. During normal operation, the field weakening is brought about according to the present invention by the centrifugal force, which increases with increasing rotational speed. According to the present invention, it is now provided that the field weakening operation may also be controlled in a fail-safe mode with the aid of the actuator. This takes place, for example, during an active short circuit of a converter which is provided for controlling the dynamoelectric machine. Due to the option for bringing about the field weakening operation abruptly, and thus, a marked reduction in the excitations, during such an active short circuit with the aid of the actuator, the short-circuit torque of the machine may be limited. In contrast, if the terminals of the machine are opened in the event of an error, due to the forced field weakening the voltage induced in the stator windings may be reduced.

The dynamoelectric machine advantageously includes permanent magnets which are situated in magnet pockets of the rotor and magnetized essentially tangentially with respect to the circumferential direction of the rotor.

In one advantageous embodiment of the present invention, the field weakening mechanism may be designed in such a way that the permanent magnets are radially displaced by the field weakening mechanism, and the rotor is designed in such a way that a radially outwardly directed displacement of the permanent magnets causes weakening of the excitation field in the air gap.

To ensure that this field weakening occurs only at rotational speeds above the nominal rotational speed of the machine, in one advantageous embodiment of the present invention the permanent magnets may be pretensioned in a radially inwardly situated position by one or multiple springs, whereby the spring constant is to be appropriately dimensioned.

Instead of radially displaceable permanent magnets, in another advantageous embodiment of the present invention, displaceable flux-guiding elements may be provided which are guided in radially extending grooves, and whose radial position influences the density of the excitation field in the air gap. These types of leakage flux-guiding elements short-circuit a portion of the magnetic flux generated by the permanent magnets when the former are in a radially outwardly situated position, this radially outwardly situated position being brought about during normal operation by the centrifugal force, which increases with increasing rotational speed.

In this regard, one advantageous embodiment of the present invention is characterized in that the actuator includes a cam disk on each axial-side end of the rotor, the rotation of the cam disk with respect to the rotor effectuating a radially outwardly directed displacement of the leakage flux-guiding elements. In this way, in the event of an error, for example, the actuator may be controlled to displace the leakage flux-guiding elements outwardly, viewed radially, in the direction of the air gap, independently of the centrifugal force and thus independently of the rotational speed, and thus to bring about the field weakening operation. The same radial displacement of the leakage flux-guiding elements would also be effectuated by the centrifugal force when the rotational speed is sufficiently high, so that at an increased rotational speed of the machine, a corresponding rotation of the cam disk with respect to the rotor also results.

To ensure that in this specific embodiment the field weakening operation is not started until above a certain reference rotational speed, it may advantageously be provided that the cam disks in each case are pretensioned by a return spring in a rotation angle position in which the leakage flux-guiding elements are situated in a radially inwardly situated position.

One alternative specific embodiment with leakage flux-guiding elements is characterized in that the leakage flux-guiding elements are pretensioned radially inwardly on each axial-side end of the rotor by a disk spring situated on the rotor shaft, and the actuator is designed in such a way that it may apply an axial force to the disk spring which counteracts the pretension. In this regard, for example an actuator may press an axially movable sleeve in each case onto one of the disk springs, so that the disk spring effectuates a radially directed displacement of the flux-guiding elements in the direction of the air gap.

Another advantageous embodiment of the machine is characterized in that the grooves are situated in a first material having a first permeability, and the magnet pockets are situated in a second material having a second permeability which is greater than the first permeability, the grooves being situated in radial alignment with the magnet pockets, so that the leakage flux-guiding elements are at least partially displaceable from a groove into a magnet pocket. As long as the leakage flux-guiding elements are situated in the area of the first material having the lower permeability, they do not represent a significant leakage flux path for the flux generated by the permanent magnets. For initiating the field weakening range, the leakage flux-guiding elements in each case are displaced from a groove into a magnet pocket, so that they become increasingly closer to the second material having the higher permeability. The more deeply the leakage flux-guiding elements penetrate into the magnet pocket, the more high-permeable rotor material is available for the leakage flux.

In another advantageous embodiment of the present invention, a type of spoke design for the rotor may be created in that the rotor includes a central, essentially cylindrical base body made of the first material in which the grooves are formed, and multiple flux-guiding elements made of the second material are situated in a partially ring-shaped cross section on a lateral surface of the base body to form a complete ring, in each case two flux-guiding elements being spaced apart from one another in the circumferential direction by a magnet pocket. The flux-guiding elements may be connected in a form-fit manner to the base body. This results in a type of segmented rotor design, which also has significant advantages with regard to manufacturing costs. It is conceivable, for example, for the cylindrical base body to be made of the first, low-permeable material as a solid body, and for the flux-guiding elements to be made of high-permeable magnetic steel sheets that are punch-packed on top of one another in the axial direction. Due to the flux-guiding elements having a partially ring-shaped cross section, sheet metal scrap may be reduced compared to completely circular or completely ring-shaped elements.

A dynamoelectric machine according to one of the specific embodiments described above is very well suited for use in at least partially electrically driven vehicles, such as battery-operated electric vehicles or hybrid vehicles.

BRIEF DESCRIPTION OF THE DRAWINGS

The present invention is described in greater detail below with reference to the specific embodiments illustrated in the figures.

Elements having an identical function are associated with the same reference numerals in all the figures.

DETAILED DESCRIPTION

Figure 1:
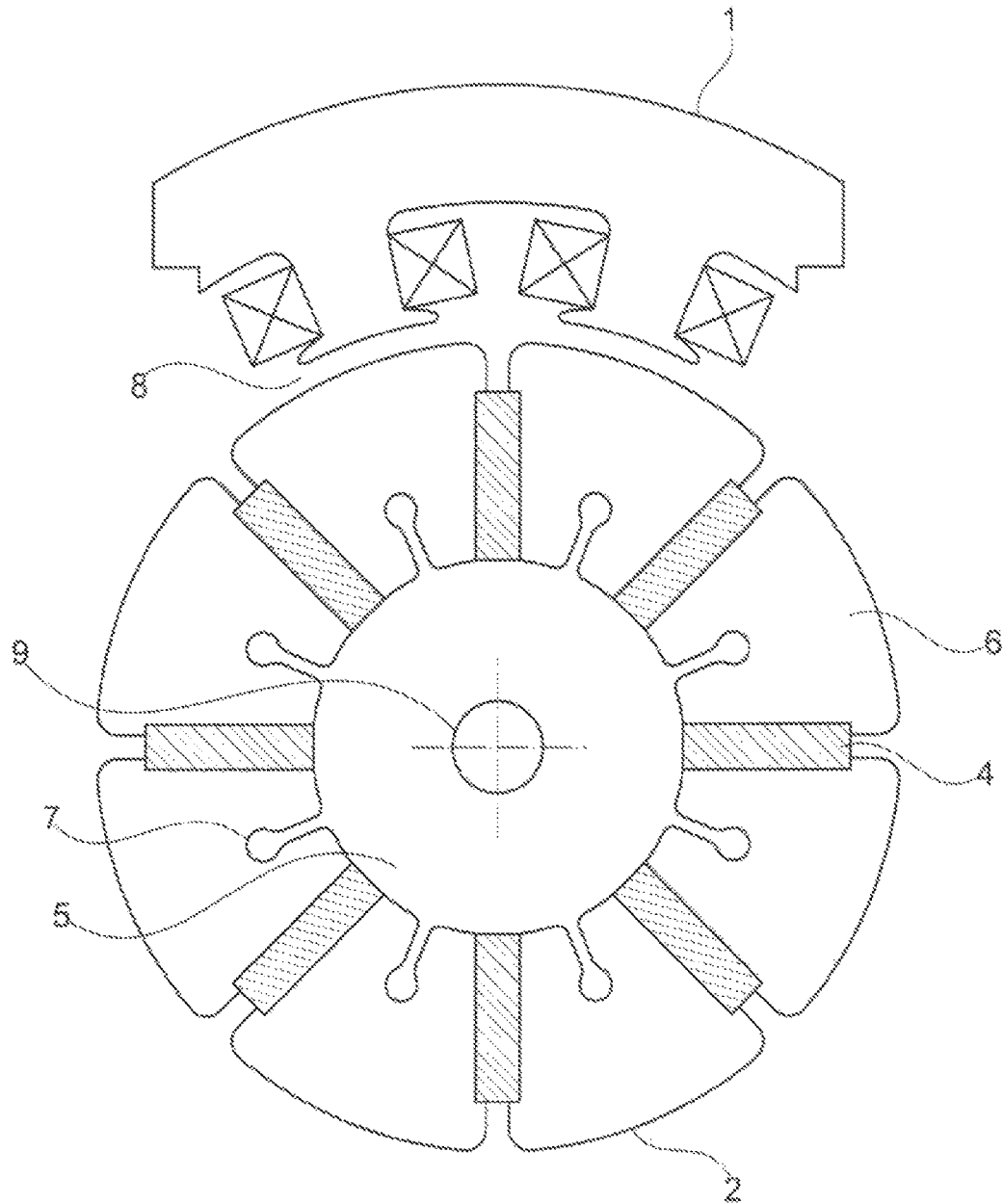
FIG. 1 shows a design of a permanently excited dynamo-electric machine known from the prior art.

FIG. 1 shows a design of a permanently excited dynamo-electric machine known from the prior art.

Only a partially ring-shaped detail of a stator 1 designed according to toothed-coil technology is illustrated. Stator 1 concentrically surrounds a rotor 2 which is designed as an internal rotor and which is connected to a rotor shaft 9 in a rotatably fixed manner. Stator 1 and rotor 2 are spaced apart from one another in the radial direction via an air gap 8. In order to generate the excitation field which permeates radially through air gap 8, rotor 2 includes permanent magnets 4 which are buried in magnet pockets. These permanent magnets 4 are magnetized in the circumferential direction of rotor 2, and thus orthogonally with respect to the radial direction and axial direction of the rotor. Each permanent magnet 4 is adjoined on both sides in the circumferential direction by two flux-guiding elements 6 made of high-permeable material, for example punch-packed magnetic steel sheets. Within these flux-guiding elements 6, the magnetic flux, which initially emanates from permanent magnets 4 in the circumferential direction, is deflected in a radial direction, so that the magnetic flux lines pass essentially radially through air gap 8. In addition to permanent magnets 4, rotor 2 is made up of two essential further elements: a base body 5 which establishes the rotatably fixed connection to rotor shaft 9 and is situated in the radially inner area of rotor 2, and flux-guiding elements 6 which are connected in a form-fit manner to this base body 5. During assembly, flux-guiding elements 6 may be pushed axially onto corresponding form-fit elements 7 of base body 5. The circumferential extension of flux-guiding elements 6 is selected in such a way that magnet pockets for accommodating permanent magnets 4 remain in the spaces between the flux-guiding elements.

To be able to operate such a permanently excited dynamoelectric machine in the field weakening range, a suitable current component must be incorporated into the stator current of the machine which counteracts the excitation field generated by permanent magnets 4. However, this type of electrical field weakening, which may be achieved, for example, with the aid of the known field-oriented control, is associated with increased losses within the machine, and thus, an accompanying reduction in its efficiency.

The figures described below show by way of example how the dynamoelectric machine illustrated in FIG. 1 may be modified to allow a field weakening operation with high electrical efficiency.

Figure 2:
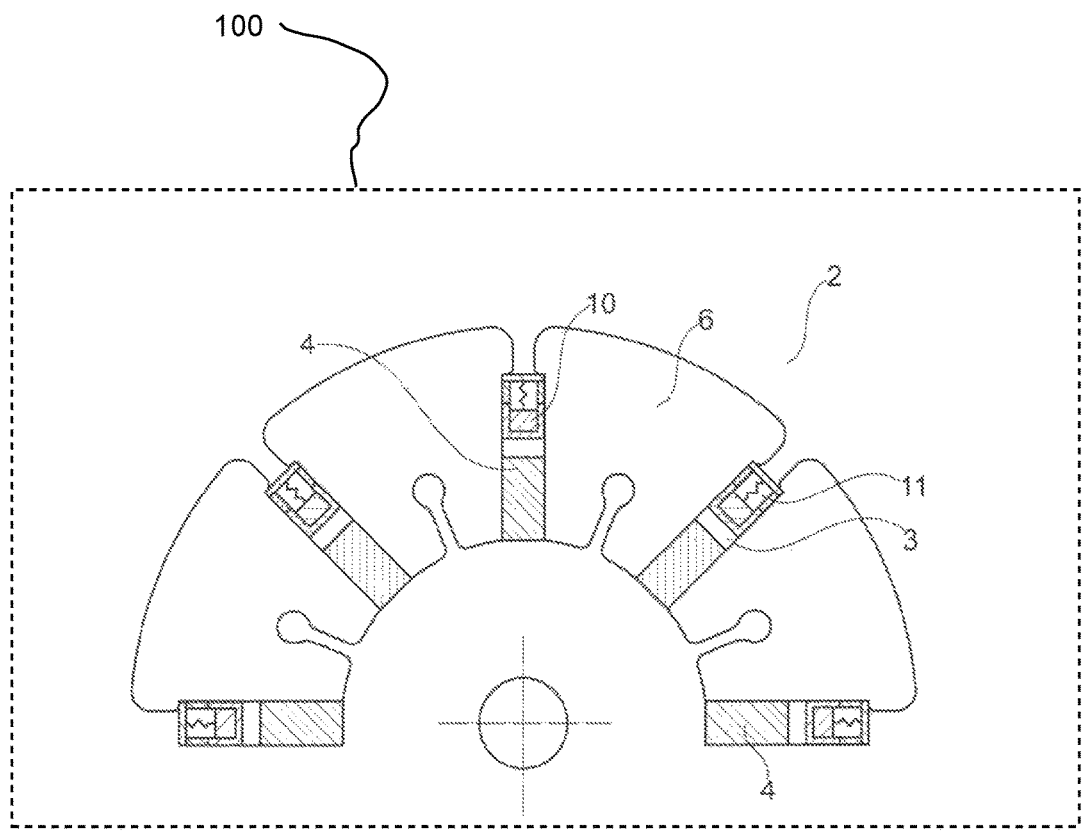
FIG. 2 shows a first specific embodiment of a rotor according to the present invention, having centrifugal force-controlled field weakening.
Figure 3:
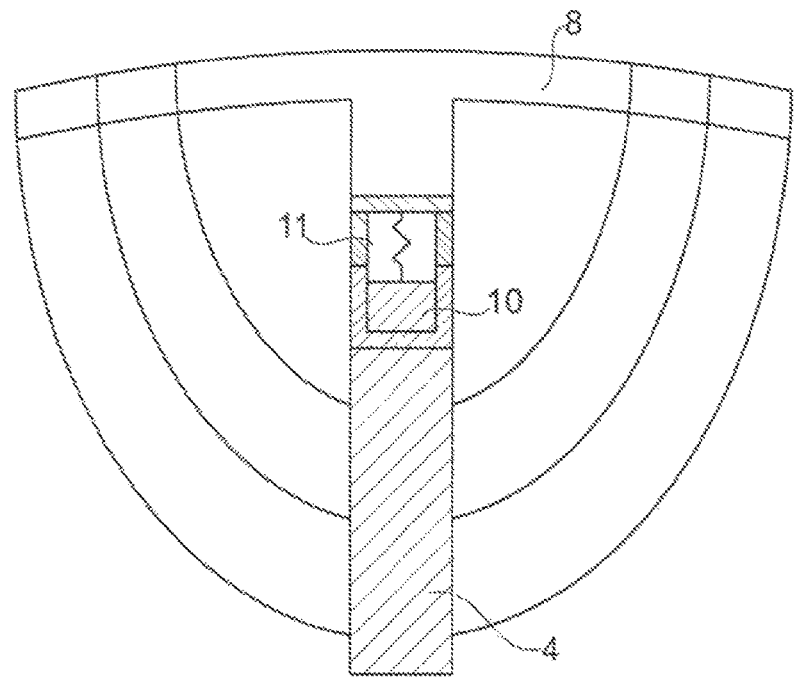
FIG. 3 shows a detail of the rotor according to FIG. 2, in a first operating state.

FIG. 2 shows a first specific embodiment of a rotor 2 according to the present invention for an electric vehicle 100 shown schematically, the rotor 2 having centrifugal force-controlled field weakening. The rotor from FIG. 1 has now been modified in such a way that radially movable leakage flux-guiding elements 10 which are embedded in magnetically poorly conductive material are situated radially above permanent magnets 4 in magnet pockets 3. These leakage flux-guiding elements 10 are pretensioned by springs 11 in such a way that, at a machine speed which is below nominal rotational speed of the machine, they assume a radially maximum inwardly situated position in which they are completely embedded in the magnetically poorly conductive material. This operating state is illustrated in FIG. 3. It is apparent that leakage flux-guiding element 10 is situated in an embedding 15 made of low-permeable material, and thus remains without effect from a magnetic standpoint. The magnetic flux generated by permanent magnets 4 is virtually completely closed over the air gap.

Figure 4:
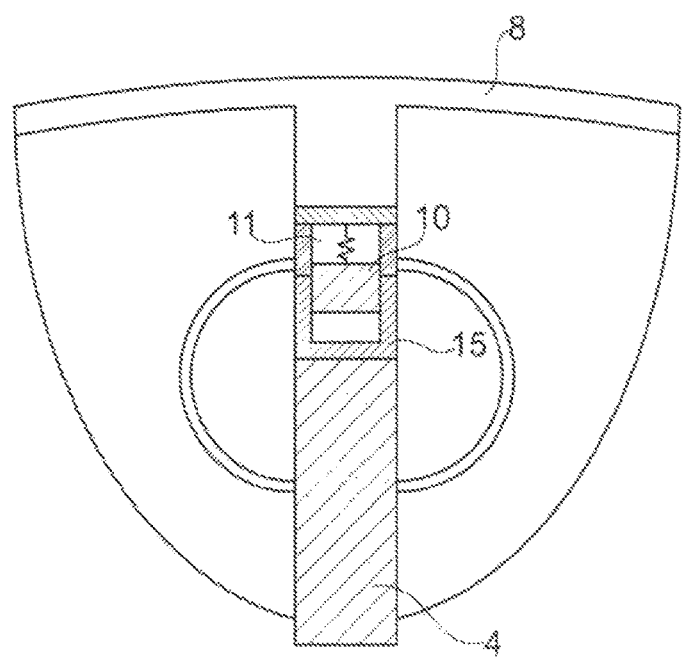
FIG. 4 shows a detail of the rotor according to FIG. 2, in a second operating state.

In contrast, FIG. 4 illustrates an operating state of the machine in which leakage flux-guiding element 10 is pushed out of the embedding in the direction of the air gap. This change in position is effectuated by an increased centrifugal force due to a machine speed that is above the nominal rotational speed of the machine. In this position, leakage flux-guiding element 10 now adjoins the high-permeable material of flux-guiding elements 6. At this location, this material may short-circuit a significant portion of the magnetic flux generated by permanent magnets 4, so that this leakage flux portion is no longer available for torque formation in air gap 8. This position may be brought about on the one hand by the centrifugal force, and on the other hand by an actuator, not illustrated here, which may move this radially outwardly situated position of leakage flux-guiding elements 10, independently of the machine speed, in particular in the event of an error.

Figure 5:
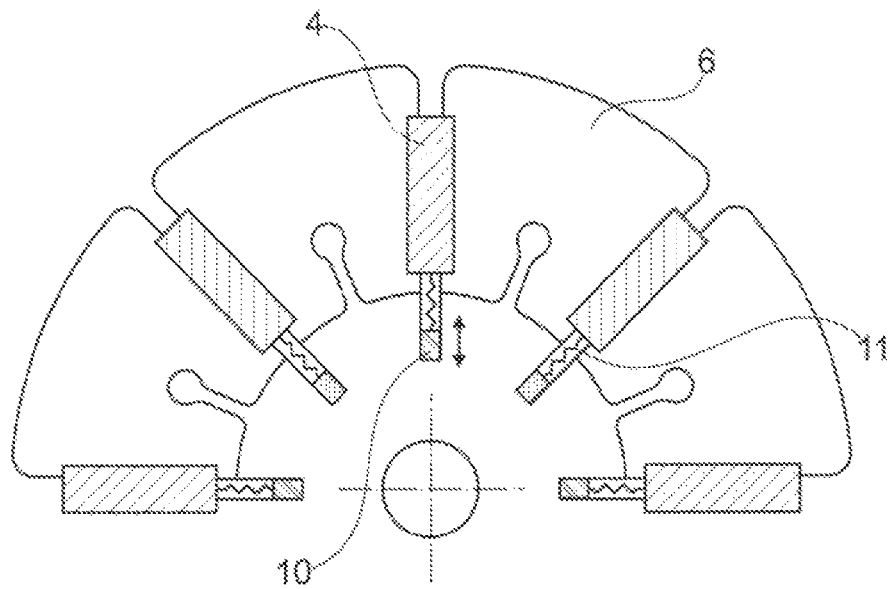
FIG. 5 shows a second specific embodiment of a rotor according to the present invention, having centrifugal force-controlled field weakening.
Figure 6:
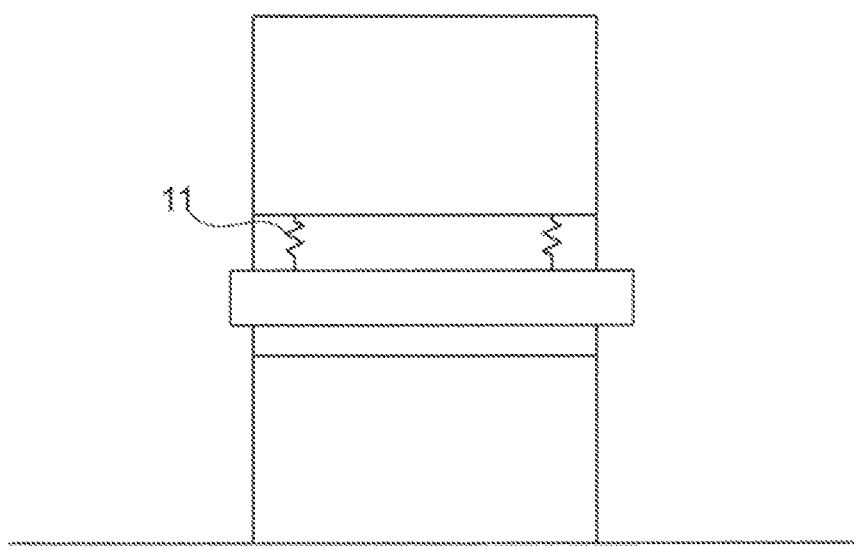
FIG. 6 shows a spring for pretensioning leakage flux-guiding elements.

FIG. 5 shows a second specific embodiment of a rotor 2 according to the present invention, having centrifugal force-controlled field weakening. Here as well, radially movable leakage flux-guiding elements 10 are provided, but are now situated below permanent magnets 4, which are magnetized in the circumferential direction. At low rotational speed, the leakage flux-guiding elements are situated in base body 5, which has a much lower permeability compared to flux-guiding elements 6. In this position, leakage flux-guiding elements 10 are held by a spring 11, clearly apparent in FIG. 6. If the centrifugal force, or also an actuator (not illustrated in FIGS. 5 and 6), effectuates a displacement of leakage flux-guiding elements 10 in the direction of the air gap, i.e., in the radially outward direction, leakage flux-guiding elements 10 penetrate into an area in which they at least partially circumferentially adjoin high-permeable flux-guiding elements 6. Similarly as in the specific embodiment illustrated in FIGS. 2 through 4, this results in a short circuit of a portion of the magnetic flux that is generated by permanent magnets 4, and thus results in field weakening.

Figure 7:
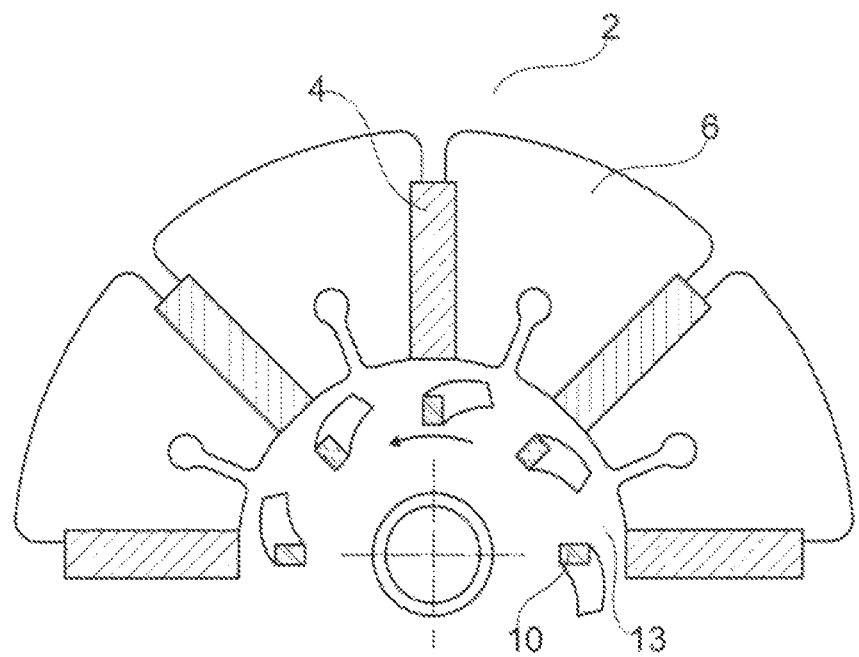
FIG. 7 shows a front-side top view onto a rotor together with an actuator for controlling a field weakening mechanism.
Figure 8:
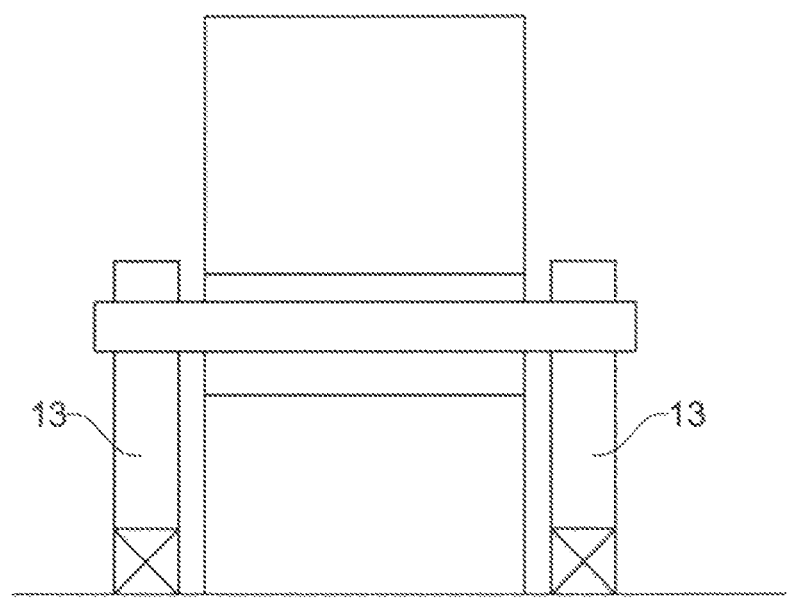
FIG. 8 shows a side view of the rotor according to FIG. 7.

FIG. 7 shows a front-side top view onto a rotor 2 together with an actuator for controlling a field weakening mechanism. A cam disk 13 is situated on each front side of the actuator. Leakage flux-guiding elements 10 are supported in correspondingly formed grooves within this cam disk 13. In the illustrated position, the leakage flux-guiding elements are in their innermost position, viewed radially. A displacement of leakage flux-guiding elements 10 in the direction of the air gap is effectuated by a rotation of cam disks 13 against rotor 2. Cam disks 13 are initially pretensioned by a return spring, not illustrated here, in such a way that leakage flux-guiding elements 10 are inwardly situated, viewed radially.

Due to increasing centrifugal force, each of the cam disks rotates in such a way that leakage flux-guiding elements 10, following the centrifugal force, may assume a position that is closer to the air gap. In order for such a position, which results in the field weakening, to be controlled in particular in the event of an error, also independently of the machine speed, cam disk 13 is rotatable against the return spring, also via a suitable actuator.

Figure 9:
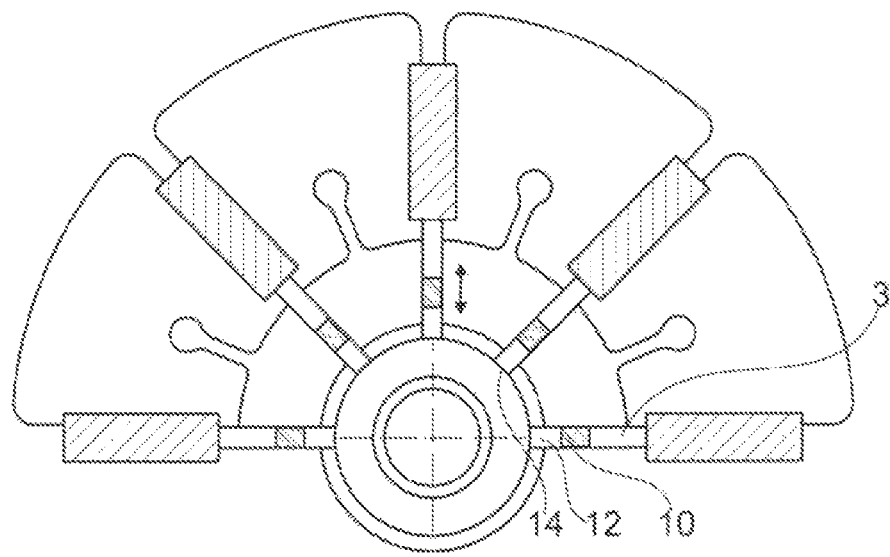
FIG. 9 shows a front-side top view onto a rotor together with a further actuator for controlling a field weakening mechanism.

FIG. 9 shows a front-side top view onto a rotor 2 together with a further actuator for controlling a field weakening mechanism. Leakage flux-guiding elements 10 are hereby radially pretensioned by disk springs or octopus springs 14, so that at low rotational speed they assume an inner position in which magnetic flux does not pass through them. Disk spring 14 is dimensioned in such a way that it allows a radially outwardly situated position of leakage flux-guiding elements 10 when the machine reaches a rotational speed above the nominal rotational speed. In this way, the field weakening operation begins above the nominal rotational speed. Here as well, the centrifugal force acts against the pretension of disk spring 14.

Figure 10:
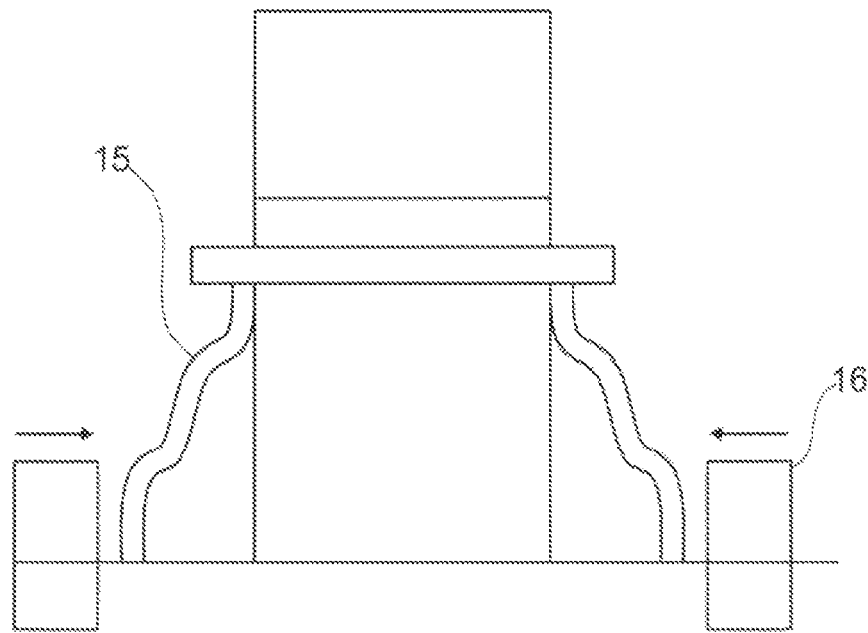
FIG. 10 shows a side view of the rotor according to FIG. 9.

Independently of speed, such a position of leakage flux-guiding elements 10 may also be reached with the aid of pressure sleeves 16, apparent in FIG. 10. One of these pressure sleeves 16 is present at each front side of rotor 2. Via a suitable actuator, the pressure sleeves may act axially on disk springs 15, so that leakage flux-guiding elements 10 are pushed outwardly, viewed radially, without the machine speed, which is necessary for this purpose during normal operation, being present.

LIST OF REFERENCE NUMERALS 1 stator
2 rotor
3 magnet pockets
4 permanent magnets
5 base body
6 flux-guiding elements
7 form-fit elements
8 air gap
9 rotor shaft
10 leakage flux-guiding elements
11 spring
12 grooves
13 cam disk
14 disk spring
15 embedding
16 pressure sleeve

What is claimed is:

1. A dynamoelectric permanently excited machine comprising:
    a stator;
    a rotor spaced apart from the stator via an air gap;
    permanent magnets situated on the rotor for generating an excitation field in the air gap; and
    a centrifugal force-controlled field weakening mechanism for weakening the excitation field in the air gap as a function of rotational speed; and
    a signal input for an error signal and an actuator for controlling the field weakening mechanism independently of the rotational speed.

2. The dynamoelectric permanently excited machine as recited in claim 1 wherein the permanent magnets are magnetized tangentially with respect to a circumferential direction of the rotor and situated in magnet pockets of the rotor.

3. The dynamoelectric permanently excited machine as recited in claim 1 wherein the field weakening mechanism is designed for radially displacing the permanent magnets, and the rotor is designed in such a way that a radially outwardly directed displacement of the permanent magnets causes weakening of the excitation field in the air gap.

4. The dynamoelectric permanently excited machine as recited in claim 3 wherein the permanent magnets are pretensioned in a radially inwardly situated position by a spring.

5. The dynamoelectric permanently excited machine as recited in claim 1 further comprising displaceable leakage flux-guiding elements guided in radially extending grooves and having a radial position capable of influencing a density of the excitation field in the air gap.

6. The dynamoelectric permanently excited machine as recited in claim 5 wherein the actuator includes a cam disk on each axial-side end of the rotor, a rotation of the cam disk with respect to the rotor effectuating a radially outward displacement of the leakage flux-guiding elements.

7. The dynamoelectric permanently excited machine as recited in claim 6 wherein the cam disks in each case are pretensioned by a return spring in a rotation angle position in which the leakage flux-guiding elements are situated in a radially inwardly situated position.

8. The dynamoelectric permanently excited machine as recited in claim 5 characterized in that the leakage flux-guiding elements are pretensioned radially inwardly on each axial-side end of the rotor by a disk spring situated on a rotor shaft, and the actuator is designed to apply an axial force to the disk spring counteracting the pretension.

9. The dynamoelectric machine as recited in claim 5 wherein the grooves are situated in a first material having a first permeability, magnet pockets receiving the permanent magnets are situated in a second material having a second permeability which is greater than the first permeability, the grooves being situated in radial alignment with the magnet pockets, so that the leakage flux-guiding elements are at least partially displaceable from a groove into a magnet pocket.

10. An at least partially electrically driven vehicle comprising the dynamoelectric machine as recited in claim 1.

* * * * *